United States Patent
Ito

[11] Patent Number: 6,154,087
[45] Date of Patent: Nov. 28, 2000

[54] SENSOR OUTPUT COMPENSATION CIRCUIT

[75] Inventor: Satoru Ito, Aichi, Japan

[73] Assignee: Kabushiki Kaisha Toyoda Jidoshokki Seisakusho, Kariya, Japan

[21] Appl. No.: 09/162,906

[22] Filed: Sep. 29, 1998

[30] Foreign Application Priority Data

Oct. 3, 1997  [JP]  Japan .................................. 9-271169

[51] Int. Cl.$^7$ .................................................. H03K 17/78
[52] U.S. Cl. ............................................ 327/512; 327/362
[58] Field of Search ................................... 327/512, 513, 327/378, 362, 509

[56] References Cited

U.S. PATENT DOCUMENTS 5,197,334   3/1993   Guziak ........................................ 73/708
5,604,468   2/1997   Gillig .......................................... 331/176

FOREIGN PATENT DOCUMENTS 720162   1/1995   Japan ............................. G01R 17/12

Primary Examiner—Tuan T. Lam
Assistant Examiner—Hiep Nguyen
Attorney, Agent, or Firm—Morgan & Finnegan, L.L.P.

[57] ABSTRACT

A sensor drive unit drives a sensor with an electric current. A differential current generation unit outputs a current which changes with a temperature. A compensation current output unit includes a plurality of current generation circuits. Each current generation circuit generates a current proportional to a current output from the differential current generation unit. Each current generation circuit has a transistor switch. Each transistor switch is controlled for its ON/OFF state according to input from terminals Ts0, Ts1, . . . The information input to the terminals Ts0, Ts1, . . . is stored in the memory. The compensation current output unit adds the output from the current generation circuits corresponding to the transistor switches in the ON state, and outputs the result as a sensitivity compensation current Its. The sensitivity compensation current Its is applied to the sensor.

11 Claims, 6 Drawing Sheets

FIG. 6

SENSOR OUTPUT COMPENSATION CIRCUIT

BACKGROUND OF THE INVENTION

1. Field of the Invention

The present invention relates to a circuit for compensating for, corresponding to a change in temperature, the output of a sensor containing a resistor having a variable resistance value depending on the physical quantity of an object to be measured.

2. Description of the Related Art

A sensor containing a resistor having a variable resistance value depending on the physical quantity of an object to be measured is very popular. For example, with this type of pressure sensor, the resistance value of a resistor in the sensor changes with pressure, and the output current or output voltage of the sensor changes with the resistance value of the resistor. Therefore, a change in pressure can be measured by detecting a change in electric current or voltage. However, the amount of a change in a resistance value corresponding to a change in pressure normally depends on temperatures. Also, resistance value of a resistor itself and a characteristics of an amplification provided in a sensor depend on temperatures. Therefore, the output of a sensor has thermal characteristics and the temperature characteristics vary for each sensor. As a result, a temperature compensation circuit for compensating for the characteristics has been provided according to the conventional technology.

The temperature compensation circuit contains, for example, a resistor whose resistance value depends on temperatures, and the temperature dependency of the sensor can be compensated for by applying to the sensor an electric current or voltage generated based on the electric current flowing through the resistor. The Applicant of the present invention previously applied for a patent (Tokukaihei 7-20162) on the sensor output compensation circuit with the above described configuration.

However, in the conventional sensor output compensation circuit including the configuration according to the above described patent application (Tokukaihei 7-20162), it is necessary to perform a trimming process on a resistor provided in the compensation circuit such that the physical quantity of an object to be measured and the sensor output value can be equal to predetermined values. The trimming process is performed by detecting the output from a sensor a plurality of times with the measurement environment changed (for example, pressure and temperature for a pressure sensor), and trimming the resistor using a laser beam by referring to the detection result. Therefore, trimming devices have normally been very large and expensive.

SUMMARY OF THE INVENTION

The present invention aims at solving the above described problem and providing a sensor output compensation circuit for adjusting necessary values without a trimming device.

The sensor output compensation circuit according to the present invention compensates for the output from the sensor containing a resistor whose resistance value changes with the physical quantity of an object to be measured. The sensor output compensation circuit includes the following units. A drive unit drives the sensor. A temperature detection unit outputs an electric current which changes with a temperature. A temperature-compensating-current generation unit includes a plurality of current generation circuits for generating an electric current based on the electric current output from the temperature detection unit; and a plurality of switches for passing/interrupting the output from each of the electric current generation circuits. With this configuration, the temperature-compensating-current generation unit outputs a sum of the electric currents generated by the electric current generation circuits corresponding to the switches in the ON state. A storage unit stores information indicating the ON/OFF state of the plurality of switches provided in the temperature-compensating-current generation unit. The drive state of the sensor is changed according to the output from the temperature-compensating-current generation unit.

BRIEF DESCRIPTION OF THE DRAWINGS

FIG. 6 shows the configuration of the sensor output compensation circuit according to another embodiment of the present invention.

DESCRIPTION OF THE PREFERRED EMBODIMENTS

Figure 1:
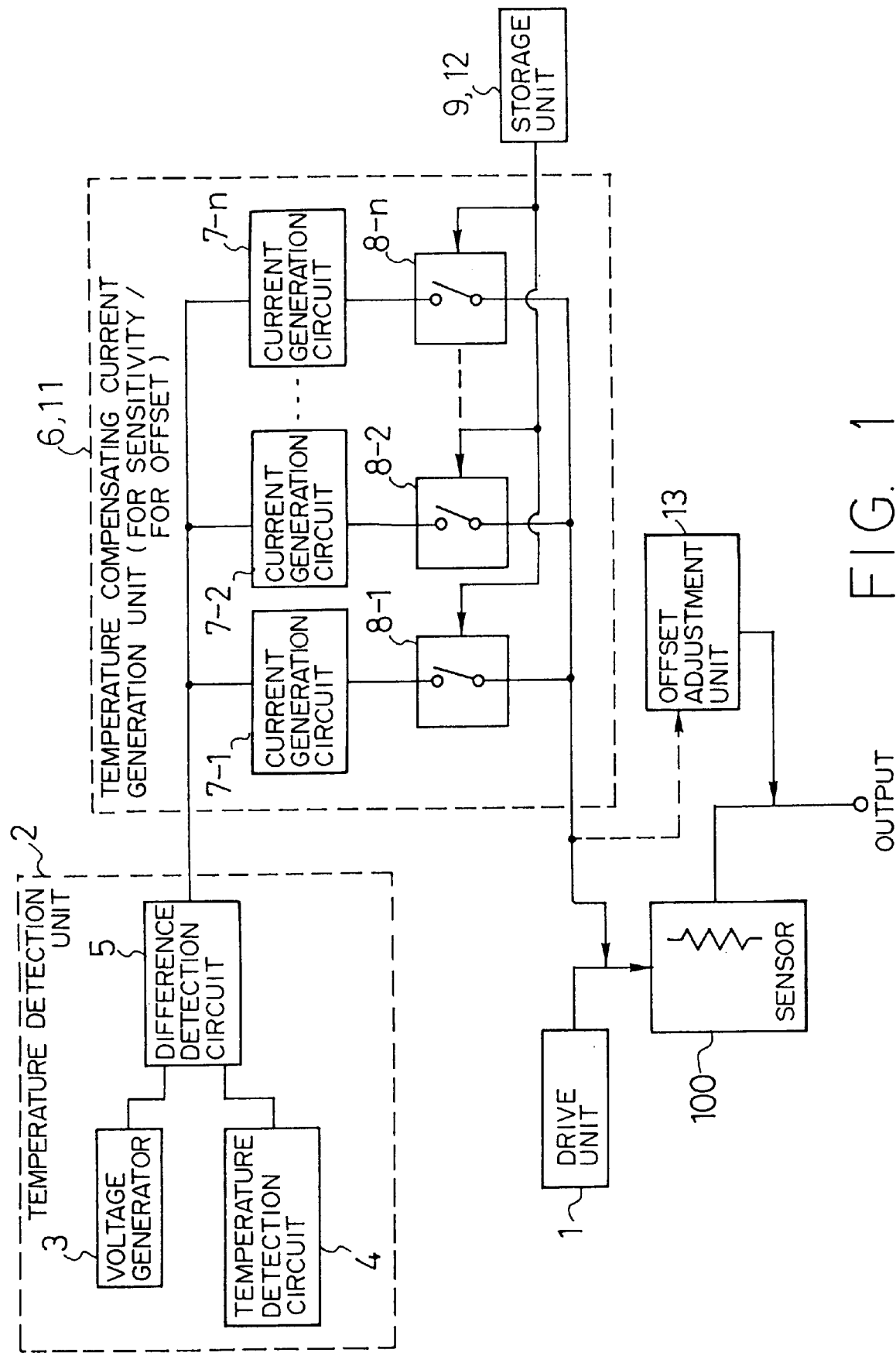
FIG. 1 is a block diagram showing the basic configuration of the present invention.

The basic configuration and the operations of the present invention are described below.

The sensor output compensation circuit according to the present invention is based on the configuration in which the temperature dependency of the output from a sensor 100 containing a resistor whose resistance value changes with the physical quantity of an object to be measured is compensated for. A constant current or voltage is applied to the sensor 100. When the physical quantity of the object to be measured is changed, the resistance value of the resistor is changed, and the output voltage of the sensor 100 is changed. Therefore, the physical quantity can be measured by detecting the output voltage of the sensor 100.

A drive unit 1 drives the sensor 100. A temperature detection unit 2 outputs an electric current which changes with a temperature. The temperature detection unit 2 comprises, for example, a voltage generator 3 for outputting a voltage independent of temperatures; a temperature detection circuit 4 for outputting a voltage which changes with a temperature; and a difference detection circuit 5 for generating an electric current based on the difference between the output voltage from the voltage generator 3 and the output voltage from the temperature detection circuit 4. A temperature-compensating-current generation unit 6 comprises current generation circuits 7-1 through 7-n for generating an electric current depending on the electric current output from the temperature detection unit 2; and switches 8-1 through 8-n for passing/interrupting the outputs from the current generation circuits 7-1 through 7-n respectively, and outputs a sum of the electric currents generated by the electric current generation circuits corresponding to the switches in the ON state. A storage unit 9 stores information indicating the ON/OFF state of the plurality of switches 8-1 through 8-n provided in the temperature-compensating-current generation unit 6, and changes the drive state of the sensor 100 by using the output from the temperature-compensating-current generation unit 6.

With the above described configuration, each of the current generation circuits 7-1 through 7-n generates an electric current (for example, an electric current proportional to the current output from the temperature detection unit 2) depending on the electric current output from the temperature detection unit 2. Therefore, the temperature-compensating-current generation unit 6 outputs an electric current which changes with a temperature. Additionally, the temperature-compensating-current generation unit 6 outputs a sum of electric currents generated by the electric current generation circuits corresponding to the switches in the ON state. As a result, the amplitude of the output current from the temperature-compensating-current generation unit 6 depends on the ON/OFF state of the switches 8-1 through 8-n.

When the driving operation of the drive unit 1 is changed, the relationship between the physical quantity of the object to be measured and the output from the sensor 100 is changed. That is, the sensitivity of the sensor 100 changes. The driving operation of the drive unit 1 is controlled by using the output current from the temperature-compensating-current generation unit 6. Therefore, if the driving operation of the drive unit 1 is controlled by appropriately adjusting the output current from the temperature-compensating-current generation unit 6 which changes with a temperature by setting the ON/OFF state of the switches 8-1 through 8-n, then the temperature compensation can be performed on the sensitivity of the sensor 100 which changes with a temperature.

The information indicating the ON/OFF state of the switches 8-1 through 8-n is determined through measurement of the characteristics of the sensor 100, and is stored in the storage unit 9.

The sensor output compensation circuit according to the present invention further comprises a temperature-compensating-current generation unit 11 which includes a plurality of current generation circuits each for generating an electric current depending on the electric current output from the temperature detection unit 2, and a plurality of switches for passing/interrupting the output from the current generation circuits, and outputs a sum of the electric currents generated by the electric current generation circuits corresponding to the switches in the ON state; a storage unit 12 for storing the information indicating the ON/OFF state of the plurality of switches provided in the temperature-compensating-current generation unit 11; and an offset adjustment unit 13 for offsetting the output from the sensor 100. The offset adjustment unit 13 can be designed to change the offset by using the output from the temperature-compensating-current generation unit 11. Since the temperature-compensating-current generation unit 6 and the temperature-compensating-current generation unit 11 have the same configurations, they are represented as the same units in FIG. 1.

With the above described configuration, the offset also depends on temperatures. Therefore, the temperature dependency of the offset can be compensated for by using the electric current generated from the temperature-compensating-current generation unit 11 just as the sensitivity of the sensor 100 can be compensated for.

The embodiments of the present invention are described below by referring to the attached drawings.

Figure 2:
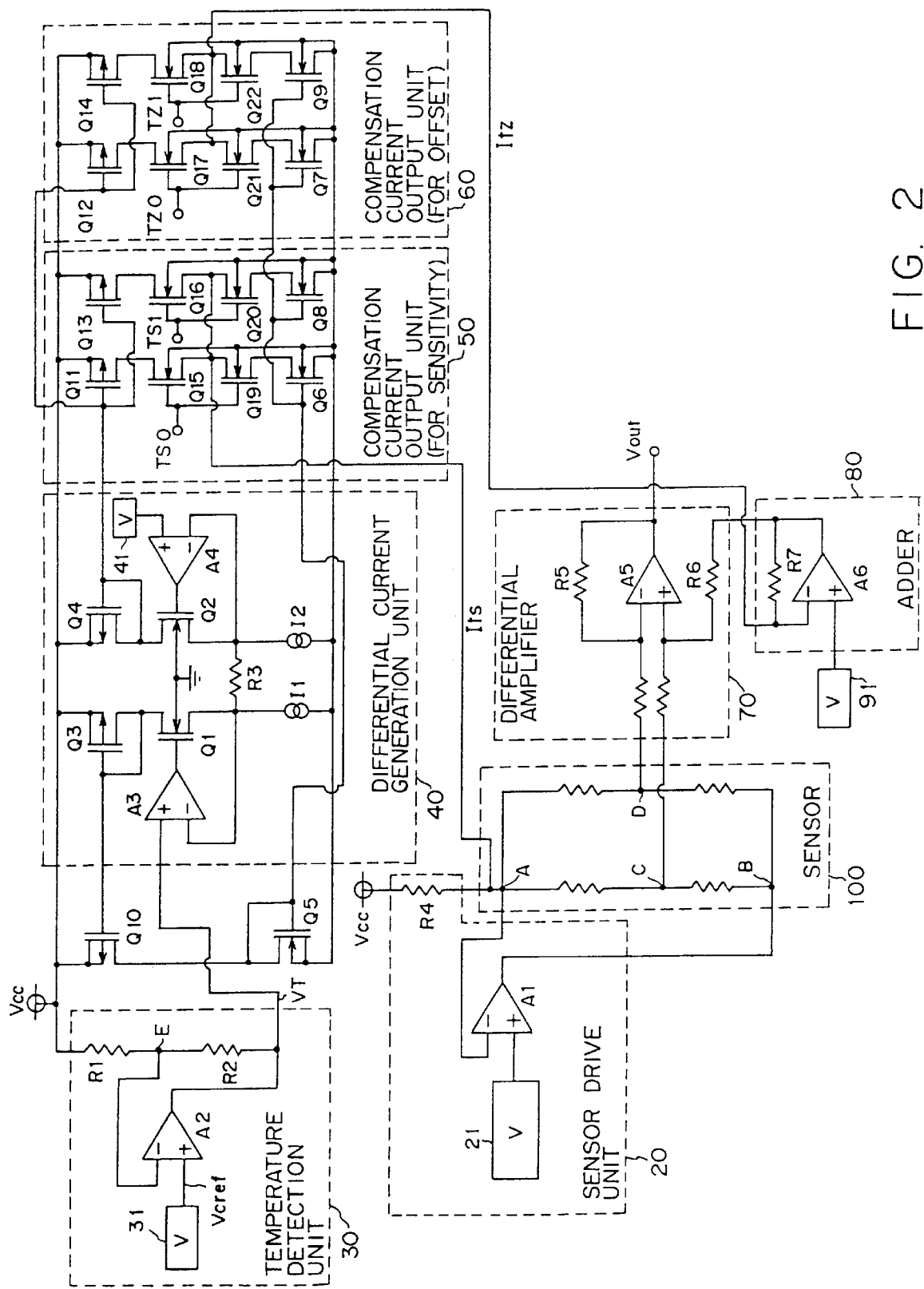
FIG. 2 shows the configuration of the sensor output compensation circuit according to an embodiment of the present invention.

FIG. 2 shows the configuration of the sensor output compensation circuit according to an embodiment of the present invention. In this example, the sensor 100 is defined as a pressure sensor. It is also assumed that the sensor 100 and a circuit for compensating for the output from the sensor 100 are arranged on the same semiconductor substrate.

The sensor 100 contains 4 resistors connected to each other in a bridge form, and is provided with a driving current by a sensor drive unit 20. The resistance values of these resistors change with pressure. The sensor 100 outputs each electric potential at each center point (points C and D) of the 4 bridge-connected resistors.

The sensor drive unit 20 provides the sensor 100 with a driving current through a resistor R4. The driving current is a constant current independent of temperatures. The sensor drive unit 20 comprises a voltage generator 21 for outputting a voltage for adjustment of the sensitivity of the sensor 100, and an amplifier A1. The output from the voltage generator 21 is applied to a non-inversion terminal of the amplifier A1, and a point A of the sensor 100 is connected to its inversion terminal. The output from the amplifier A1 is connected to a point B of the sensor 100.

A temperature detection unit 30 comprises a voltage generator 31 for generating a voltage for detection of a change in temperature; amplifier A2, a resistor R1 for supply of a constant current independent of temperatures; and a resistor R2 for generation of a voltage dependent of temperatures. Therefore, the resistor R1 has a resistance of a small temperature factor whereas the resistor R2 has a resistance of a large temperature factor. The output from the voltage generator 31 is applied to a non-inversion terminal of the amplifier A2. The connection point (point E) between the resistor R1 and the resistor R2 is connected to the inversion terminal of the amplifier A2. Furthermore, the output from the amplifier A2 is connected to the other terminal of the resistor R2, and then to a differential current generation unit 40.

The differential current generation unit 40 comprises a voltage generator 41 for outputting a voltage independent of temperatures for adjustment of a zero point of the temperature detection unit 30; constant current generators I1 and I2 for generating currents equal to each other; transistors Q1 and Q2 having equal characteristics; amplifiers A3 and A4 respectively provided for transistors Q1 and Q2; a resistor R3 for connecting the source terminals of the transistors Q1 and Q2; and transistors Q3 and Q4 having equal characteristics. The amplifier A3 receives the output from the temperature detection unit 30, and the amplifier A4 receives the output from the voltage generator 41.

When the output from the amplifier A3 is in the same state as the output from the amplifier A4, the current flowing through the transistors Q1 and Q3 matches the current flowing through the transistors Q2 and Q4, and no current flows through the resistor R3. However, if the resistance value of the resistor R2 changes with a temperature, and thereby the output from the temperature detection unit 30 changes, then the balance between the current flowing through the transistors Q1 and Q3 and the current flowing through the transistors Q2 and Q4 is lost, and the difference (current difference) flows through the resistor R3. For example, assuming that the electric currents generated by the constant current generators I1 and I2 are i, and a current $\Delta i$ flows from the transistor Q1 to the transistor Q2 through the resistor R3, the current flowing through the transistor Q3 is $i+\Delta i$, and the current flowing through the transistor Q4 is $i-\Delta i$.

The transistors Q3 and Q10 have the same characteristics, and form a current mirror. Therefore, the current flowing through the transistor Q10 is equal to the current flowing through the transistor Q3. A transistor Q5 is connected in series to the transistor Q10. That is, the current flowing through the transistor Q5 is equal to the current flowing through the transistor Q10. As a result, the current flowing through the transistor Q5 is equal to the current flowing through the transistor Q3.

A compensation current output unit 50 is a circuit for generating an electric current for compensation for the temperature dependency of the sensitivity of the sensor 100. A compensation current output unit 60 is a circuit for generating an electric current for compensation for the temperature dependency of the output offset of the sensor 100. Since the configuration of the compensation current output unit 50 is the same as that of the compensation current output unit 60, only the configuration of the compensation current output unit 50 is described here, and that of the compensation current output unit 60 is omitted here.

The compensation current output unit 50 comprises a plurality of current generation circuits. The example shown in FIG. 2 has a 2-stage configuration. In FIG. 2, the first stage contains transistors Q6, Q11, Q15, and Q19, and the second stage contains transistors Q8, Q13, Q16, and Q20. At the first stage, the transistor Q6 and the transistor Q5 form a current mirror, and the transistor Q11 and the transistor Q4 form a current mirror. The rate of these current mirrors is 1:1.

The transistors Q15 and Q19 can be switched ON and OFF according to an input signal of a terminal Ts0. When an L level signal is input to the terminal Ts0, the transistors Q15 and Q19 enter an OFF state, and no currents flow through the transistors Q6 and Q11. On the other hand, when an H level signal is input to the terminal Ts0, the transistors Q15 and Q19 enter an ON state, and the same currents flow through the transistor Q6 and the transistor Q5 while the same currents flow through the transistor Q11 and Q4. Since the same currents flow through the transistors Q5 and Q3, as described above, the same currents flow through the transistors Q6 and Q3. Therefore, if the current flowing through the transistor Q3 is i+Δi and the current flowing through the transistor Q4 is i−Δi, then the current flowing through the transistor Q11 is i−Δi and the current flowing through the transistor Q6 is i+Δi. Thus, when the current flowing through the transistor Q11 is different from the current flowing through the transistor Q6, the difference (2 Δi) is output (swept or sucked). That is, when an H level signal is input to the terminal Ts0, the current generation circuit at the first stage of the compensation current output unit 50 outputs a current two times larger than the differential current (current flowing through the resistor R3) in the differential current generation unit 40.

At the second stage of the compensation current output unit 50, the transistors Q8 and Q5 form a current mirror, and the transistors Q13 and Q4 form a current mirror. The rate of these current mirror is 1:2. Each of the transistors Q8 and Q13 can be formed by, for example, connecting in parallel two transistors which are the same as the transistors Q6 and Q11. Therefore, if an H level signal is input to a terminal Ts1 when the currents flowing through the transistors Q3 and Q4 are i+Δi and i−Δi as described above, then the current flowing through the transistor Q13 is 2·(i−Δi), and the current flowing through the transistor Q8 is 2·(i+Δi). In this case, the difference (4 Δi) of the current flowing through these two transistors is sucked at the connection point between the transistors Q16 and Q20. That is, when an H level signal is input to the terminal Ts1, the current generation circuit at the second stage of the compensation current output unit 50 outputs a current four times larger than the differential current (current flowing through the resistor R3) in the differential current generation unit 40.

An electric current generated at each stage of the compensation current output unit 50 is added together and output. That is, when an H level signal is input to the terminals Ts0 and Ts1 in the example above, the compensation current output unit 50 outputs a current 6 Δi.

Figure 3:
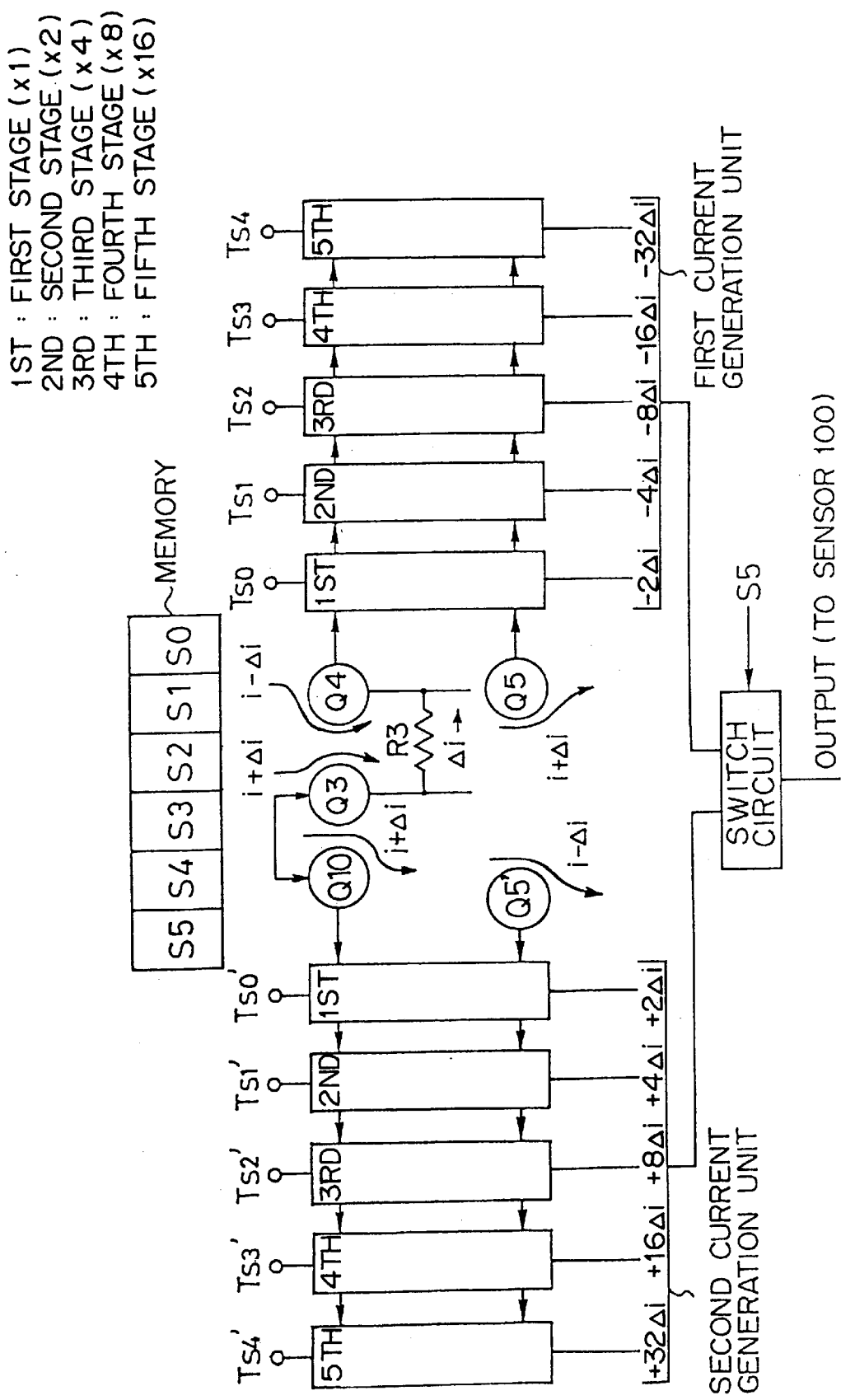
FIG. 3 shows the configuration of the compensation current output unit.

FIG. 3 shows the configuration of the compensation current output unit 50. According to the present embodiment, the compensation current output unit 50 has two current generation units. Each current generation unit comprises five stages of current generation circuits. The first through fifth current generation circuits respectively comprise sets of transistors having the rates of current mirrors of 1:1, 1:2, 1:4, 1:8, and 1:16 respectively for the transistors Q3 and Q4 provided in the differential current generation unit 40. These two current generation units generate currents having equal intensity in the opposite directions.

The current generation circuit at each stage is controlled according to the information stored in memory (for example, EPROM). The memory corresponds to the storage unit 9 shown in FIG. 1, and is omitted in FIG. 2. The information for controlling the compensation current output unit 50 is 6-bit information. The bits s0 through s4 are input to the terminals Ts0 through Ts4 and Ts0' through Ts4' respectively at each stage. The bit s5 controls a switching circuit. For example, if the information s0 through s5 stored in the memory is '010111', then the first current generation unit outputs '−46 Δi' as a sum of the currents output from the current generation circuits at the first, second, third, and fifth stages. The second current generation unit outputs '+46 Δi' as a sum of the currents output from the current generation circuits at the first, second, third, and fifth stages. A switch circuit selects output from one of the first and second current generation units according to the bit s5, and then outputs the selected output.

Thus, the compensation current output unit 50 outputs a current proportional to the differential current detected by the differential current generation unit 40 in the range from −62 Δi to +62 Δi according to the information set in the memory. The information set in the above described memory determines the proportional factor of the proportional relationship. The differential current detected by the differential current generation unit 40 changes depending on temperatures. That is, the compensation current output unit 50 outputs a current which is proportional to a current depending on temperatures and whose proportional factor depends on the information set in the memory.

The compensation current output unit 60 has the same configuration as the compensation current output unit 50, and is provided with 6-bit control information independent of the control information (6-bit information stored in the memory) provided for the compensation current output unit 50. These two pieces of 6-bit information are stored in different areas in the same memory.

A differential amplifier 70 amplifies the output from the sensor 100 by using an amplifier A5. The output from the amplifier A5 is fed back to an inverse input through a resistor R5. The output from an adder 80 is provided for non-inverse input of the amplifier A5 through a resistor R6.

The adder 80 includes an amplifier A6. The output from a voltage generator 91 is provided for a non-inverse input of an amplifier A6. The voltage generator 91 outputs an offset voltage adjustment voltage. The output from the amplifier A6 is connected to an inverse input through a resistor R7.

The output from the compensation current output unit 60 is fed to the inverse input of the amplifier A6.

Figure 4A:
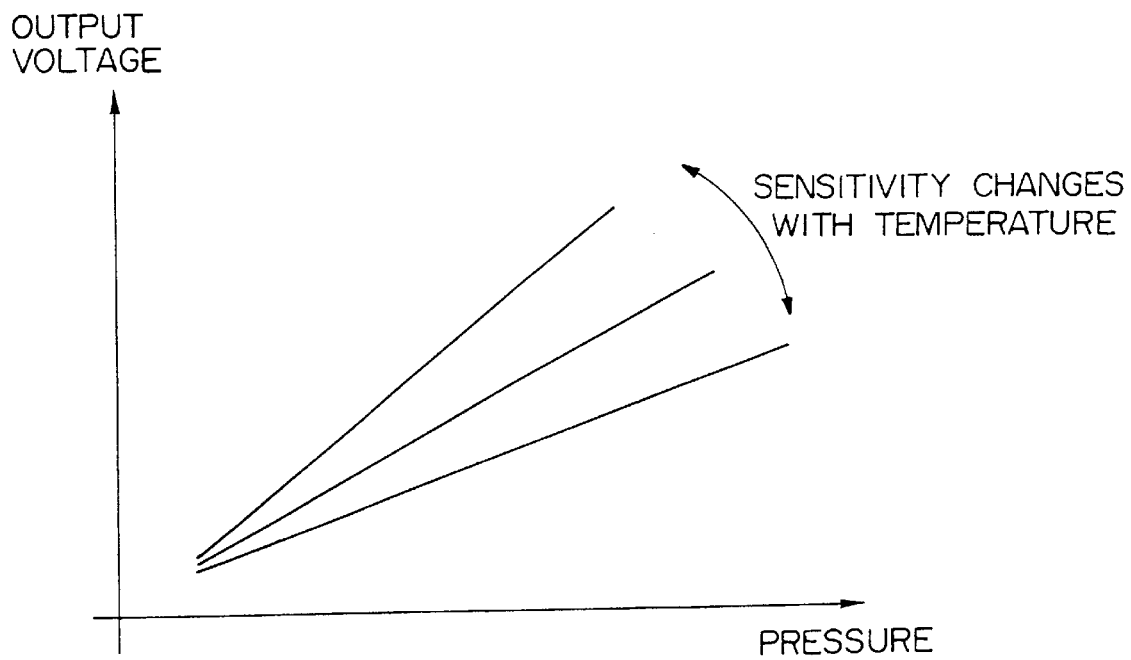
FIGS. 4A and 4B show the temperature dependency of the output from a sensor.
Figure 4B:
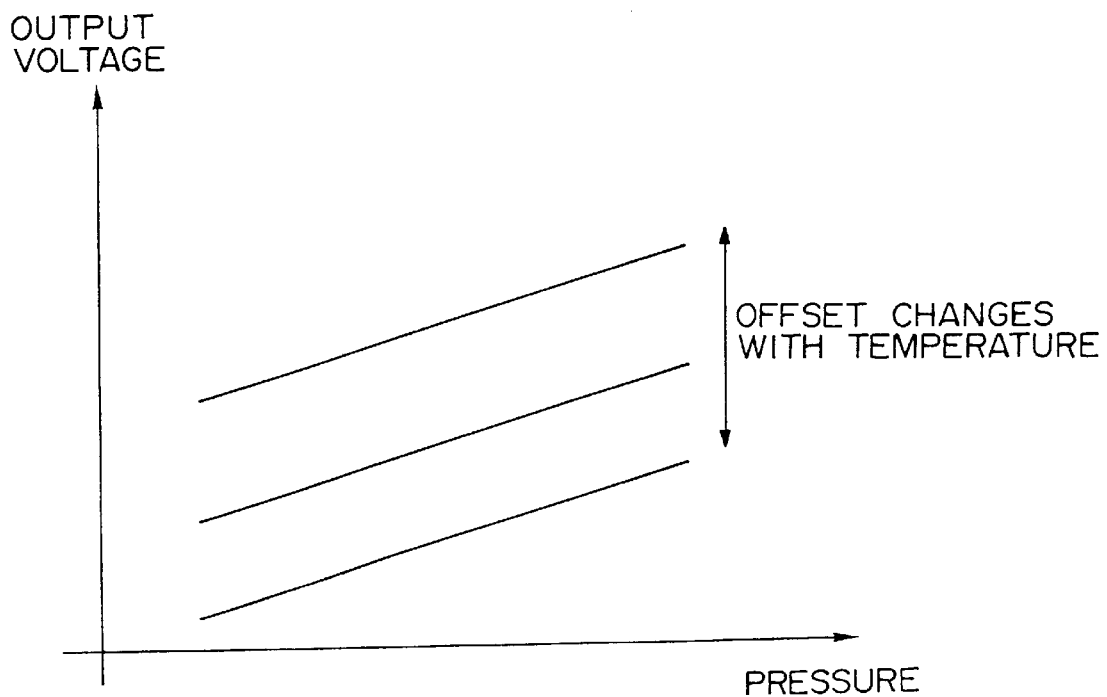

FIGS. 4A and 4B show the temperature dependency of sensor output. The ratio of a change in an output voltage to a change in pressure, that is, the sensitivity, depends on temperatures as shown in FIG. 4A. The sensitivity is represented by the slope on a graph. According to the present embodiment, the change in sensitivity is compensated for by using the current generated by the compensation current output unit 50, and constant sensitivity can be maintained even if a temperature changes.

An offset applied to the output from the sensor 100 changes depending on temperatures as shown in FIG. 4B. According to the present embodiment, a change in offset is compensated for by using a current generated by the compensation current output unit 60 so that a constant offset can be maintained even if a temperature changes.

Described below are the operations of the sensor output compensation circuit having the above described configuration. In this example, it is assumed that the output voltage from the sensor 100 changes in proportion to the pressure change ΔP (amount of a change from a reference pressure), and the output voltage Vout is proportional to both current Is flowing through the sensor 100 and the resistor R of the entire sensor 100. The current Is flowing through the sensor 100 is obtained by adding the current provided from the compensation current output unit 50 to the current provided from the sensor drive unit 20.

The output voltage Vout is represented by equation (1) below.

$$Vout = K I_s R \Delta P + Voff \quad (1)$$

where K indicates a proportional factor, and Voff indicates an offset voltage provided in the differential amplifier 70.

Relating to Sensitivity:

The compensation of the sensitivity of the sensor 100 is described first. Therefore, Voff=0 in equation (1) above.

The resistance value of the sensor 100 changes depending on temperatures. The temperature factor of this resistance value of the sensor 100 is represented by α. Therefore, the output voltage V changes depending on temperatures even if the pressure change ΔP is constant. The temperature factor of the output voltage V is represented by β. When the output voltage at the temperature of T0 is Vout, the output voltage at the temperature of T1 is represented by equation (2).

$$Vout[1 + \beta(T_1 - T_0)] = K \times R[1 + \alpha(T_1 - T_0)] \times I_s \Delta P \quad (2)$$

It is assumed that the voltage generator 41 is preliminarily adjusted such that the output voltage from the voltage generator 41 matches the output voltage from the temperature detection unit 30 at the temperature of T0. The resistor R3 through which a differential current flows in the differential current generation unit 40 is designed such that it has the same thermal characteristics as the resistor forming part of the sensor 100. These resistors are diffused resistors formed by appropriately diffusing impurities in a semiconductor area. Since the present embodiment is based on the sensor 100 and a compensation circuit arranged on the same semiconductor chip, the same thermal characteristics can be assigned to these resistors if they are formed in the same diffusion process.

The output voltage from the temperature detection unit 30 changes in proportion to a temperature. Assuming that the amount of a change in the output voltage from the temperature detection unit 30 when the temperature changes by 1° C., that is, the change rate of the output voltage to the temperature, is A (V/° C.), the sensitivity compensation current Its generated by the compensation current output unit 50 is represented by equation (3) while considering that the temperature factor of the resistor R3 is equal to the temperature factor of the resistor forming the sensor 100.

$$I_{ts} = \frac{\gamma \cdot A(T_1 - T_0)}{R3_0[1 + \alpha(T_1 - T_0)]} \quad (3)$$

where γ indicates a proportional factor adjustable by the information set in the memory shown in FIG. 3. The current Is flowing through the sensor 100 is obtained by adding the sensitivity compensation current Its provided by the compensation current output unit 50 to the current Iso provided by the sensor drive unit 20. Thus, the following equation (4) is obtained.

$$I_s = I_{so} + I_{ts} \quad (4)$$

The following equation (5) is obtained from the equations (2) and (4) above.

$$Vout[1 + \beta(T_1 - T_0)] = K \times R[1 + \alpha(T_1 - T_1)] \times (I_{so} + I_{ts})\Delta P \quad (5)$$

$$= K \times R[1 + \alpha(T_1 - T_0)] \times$$

$$\left(I_{SO} + \frac{\gamma \cdot A(T_1 - T_0)}{R3_0(1 + \alpha(T_1 - T_0))}\right)\Delta P$$

$$= K \times I_{SO} \times R[1 + \alpha(T_1 - T_0)]\Delta P + K \times$$

$$\left(\frac{\gamma \cdot A(T_1 - T_0)}{R3_0(1 + \alpha(T_1 - T_0))}\right) \times$$

$$R[1 + \alpha(T_1 - T_0)]\Delta P$$

$$= K \times I_{SO} R[1 + \alpha(T_1 - T_0)]\Delta P + K \times$$

$$\frac{R}{R3_0} \times \gamma \times A(T_1 - T_0)\Delta P$$

$$= K \times I_{SO} \times R \times \Delta P \left[1 + \alpha(T_1 - T_0) + \frac{\gamma \cdot A}{I_{SO} \cdot R3_0}(T_1 - T_0)\right]$$

The following equation (6) is obtained if a temperature-dependent item is regarded in equation (5). Then, equation (7) is obtained from equation (6).

$$Vout \cdot \beta(T_1 - T_0) = K \times I_{so} \times R \times \Delta P\left(\alpha + \frac{\gamma \cdot A}{I_{so} \cdot R3_0}\right)(T_1 - T_0) \quad (6)$$

$$\beta = \frac{K \times I_{so} \times R \times \Delta P}{Vout}\left(\alpha + \frac{\gamma \cdot A}{I_{so} \cdot R3_0}\right) \quad (7)$$

In equation (7), β indicates a temperature factor of the output voltage Vout, and γ indicates a proportional factor which can be adjusted according to the information set in the memory shown in FIG. 3. That is, the temperature factor of the output voltage Vout can be adjusted according to the information set in the memory shown in FIG. 3. By appropriately adjusting the value, the temperature factor of the output voltage Vout can be set to 0.

Since the resistance value of the resistor R1 does not basically depend on a temperature in the temperature detection unit 30, it is assumed that the temperature factor α1 is 0 and the temperature factor α2 of the resistor R2 is α simply. Equation (8) is represented by an output voltage Vcref and a power supply voltage Vcc of the voltage generator 31, and an output voltage VT of the temperature detection unit 30.

$$V_{cref} - V_T = \frac{(V_{cc} - V_{cref})}{R1_0[1+\alpha1(T_1-T_0)]} \times R2_0[1+\alpha2(T_1-T_0)] \quad (8)$$

$$\cong (V_{cc} - V_{cref}) \times \frac{R2_0}{R1_0} \times [1+\alpha2_0(T_1-T_0)]$$

where $\alpha1 \approx 0$ and $\alpha2 = \alpha$ $$V_{cref} - V\gamma = (V_{cc} - V_{cref}) \times \frac{R2_0}{R1_0} \times [1+\alpha(T_1-T_0)]$$

The output voltage of the voltage generator 41 is preliminarily adjusted to match the output voltage VT of the temperature detection unit 30 at the temperature T0. That is, at the temperature T0, the voltages applied to the control terminals of the transistors Q1 and Q2 match each other. In this case, no currents flow through the resistor R3.

At the temperature T1, the output voltage VT of the temperature detection unit 30 changes as represented by equation (8). On the other hand, the output voltage of the voltage generator 41 does not depend on temperatures. Therefore, when the temperature changes from T0 to T1, the differential input voltage ΔVT, that is, the difference between the output voltage from the voltage generator 41 and the output voltage VT from the temperature detection unit 30, refers to the amount of a change in the output voltage VT of the temperature detection unit 30. The differential input voltage ΔVT is represented in equation (9). From equation (9), the change rate A of the differential input voltage can be represented by equation (10).

$$\Delta V_T = A(T_1 - T_0) \quad (9)$$

$$= (V_{cc} - V_{cref}) \times \frac{R2_0}{R1_0} \times \alpha(T_1 - T_0)$$

$$A = (V_{cc} - V_{cref}) \times \frac{R2_0}{R1_0} \times \alpha \quad (10)$$

As represented by equations (9) and (10), the differential input voltage ΔVT is proportional to the amount of a change in temperature, and the change rate A refers to a constant. By equations (6) and (7), the output voltage of the sensor 100 is proportional to the amount of a change in temperature. That is, the output voltage of the sensor 100 is proportional to the input voltage of the sensor 100, and the amount of a change ΔVts of the input voltage of the sensor 100 generated by the sensitivity compensation current Its is proportional to temperatures. Therefore, the amount of the output voltage from the sensor 100 generated by the sensitivity compensation current Its is also proportional to temperatures.

According to the present embodiment, the thermal characteristic of a resistor of the sensor 100 is designed to be the same as that of the resistor R3 through which a differential current flows in the differential current generation unit 40. Therefore, the temperature dependency of the sensitivity of the sensor 100 can be compensated for even if the sensitivity compensation current Its is very large.

Relating to Offset:

The offset compensation current Itz for compensation for the offset voltage Voff is generated by the compensation current output unit 60. The offset compensation current Itz is represented by the following equation (11) using the proportional factor ε of the output from the temperature detection unit 30 to a change in temperature.

$$I_{tz} = \frac{\varepsilon(T_1-T_0)}{R3_0[1+\alpha(T_1-T_0)]} \quad (11)$$

where the proportional factor ε can be adjusted according to the information (corresponding to the information stored in the memory shown in FIG. 3) indicating the ON/OFF state of the current generation circuit at each stage of the compensation current output unit 60.

The resistor R7 used in the adder 80 has the same thermal characteristic as the resistor R3. In this case, the offset voltage Vtz generated by the offset compensation current Itz is represented by equation (12)

$$V_{tz} = \frac{\varepsilon(T_1-T_0)}{R3_0[1+\alpha(T_1-T_0)]} \times R7_0[1+\alpha(T_1-T_0)] \quad (12)$$

$$= \frac{R7_0}{R3_0} \times \varepsilon(T_1 - T_0)$$

In equation (11), ε is a proportional factor which can be adjusted by the information set in the memory. That is, the offset voltage Voff can be adjusted according to the information set in the memory. By appropriately setting the value, the offset voltage Voff can be constant independent of temperatures.

Described below is the method of adjusting the compensation current output units 50 and 60. In this example, it is assumed that a predetermined voltage is output when the sensitivity of the sensor meets the standard and a predetermined pressure is given. Furthermore, in this example, the adjusting method is simply explained for easily understanding the present invention.

After inputting 'all 0' as control data to the compensation current output units 50 and 60 at the temperature T0, the output voltage from the voltage generator 21 is adjusted such that the sensitivity of the sensor 100 can indicate a standard value, and the output voltage from the voltage generator 91 is adjusted such that the output voltage Vout obtained when the pressure P2 is applied can indicate a standard value. When the control data is 0, an L level signal is input to a corresponding terminal (Ts0, Ts1, . . . , Tz0, Tz1, . . . ) so that no currents flow through the current generation circuit at the stage.

Next, 'all 1' is set as control data in the compensation current output units 50 and 60. When the control data is 'all 1', an H level signal is input to a corresponding terminal (Ts0, Ts1, . . . , Tz0, Tz1, . . . ), and an electric current flows through the current generation circuit at the stage. In this state, the output voltage from the voltage generator 41 is adjusted such that the output voltage Vout obtained when the pressure P2 is applied can indicate a voltage value adjusted by using the above described voltage generator 91. At this time, the compensation current is 0, and the output voltage from the voltage generator 41 matches the output voltage VT from the temperature detection unit 30.

Figure 5:
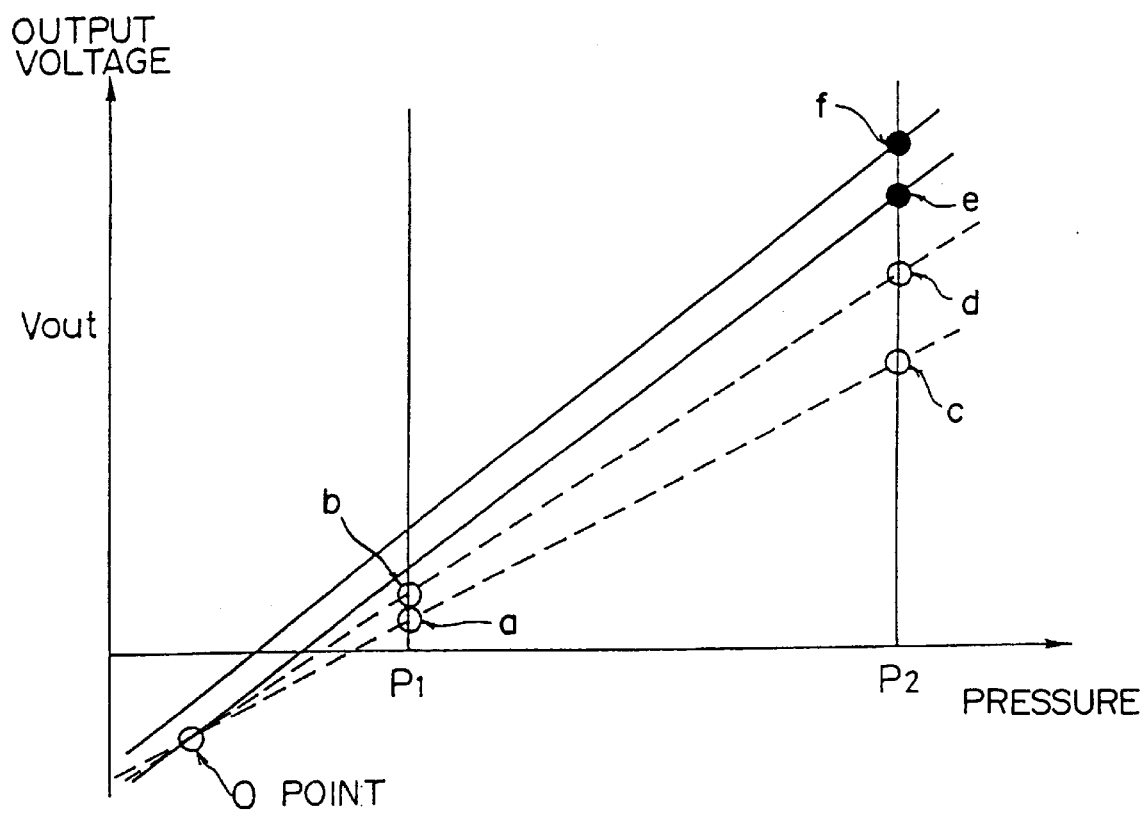
FIG. 5 shows the method of adjusting a compensation circuit.

Then, the following procedure is taken at the temperature T1. In this example, the control data to be input to the compensation current output unit 60 is first set as 'all 0'. The procedure is described by referring to FIG. 5.

(a) At the pressure P1, the output voltage a is measured with the control data to the compensation current output unit 50 defined as K1, and the output voltage b is measured with the control data to the compensation current output unit 50 defined as K2.

(b) At the pressure P2, the output voltage c is measured with the control data to the compensation current output unit 50 defined as K1, and the output voltage d is measured with the control data to the compensation current output unit 50 defined as K2.

(c) The intersection between the straight line from the output voltage a to the output voltage c and the straight line from the output voltage b and the output voltage d is obtained, and is defined as a 0 point. A point (output voltage e) at the pressure=P2 is computed such that the gradient of the straight line from the above described 0 point to a certain point at the pressure=P2 can refer to a value corresponding to standard sensitivity.

(d) The control data for the compensation current output unit 50 is adjusted such that the output voltage can reach the point e at the pressure P2.

(e) The control data for the compensation current output unit 60 is adjusted such that the output voltage can reach a predetermined standard point f at the pressure P2.

(f) Each piece of the control data obtained in (d) and (e) above is written to the memory.

If the control data is determined and written to the memory as described above, then the data is maintained afterwards. The control data corresponds to the proportional factor used when a temperature-dependent differential current is converted into a current which is proportional to the differential current. Therefore, this operation actually corresponds to the process of trimming the resistor R3 which passes the differential current and the resistor R7 used in the adder 80.

Thus, according to the present embodiment, an adjustment can be made to compensate for the temperature dependency of the sensor output without performing a laser trimming process, thereby performing a simple adjusting process.

Figure 6:
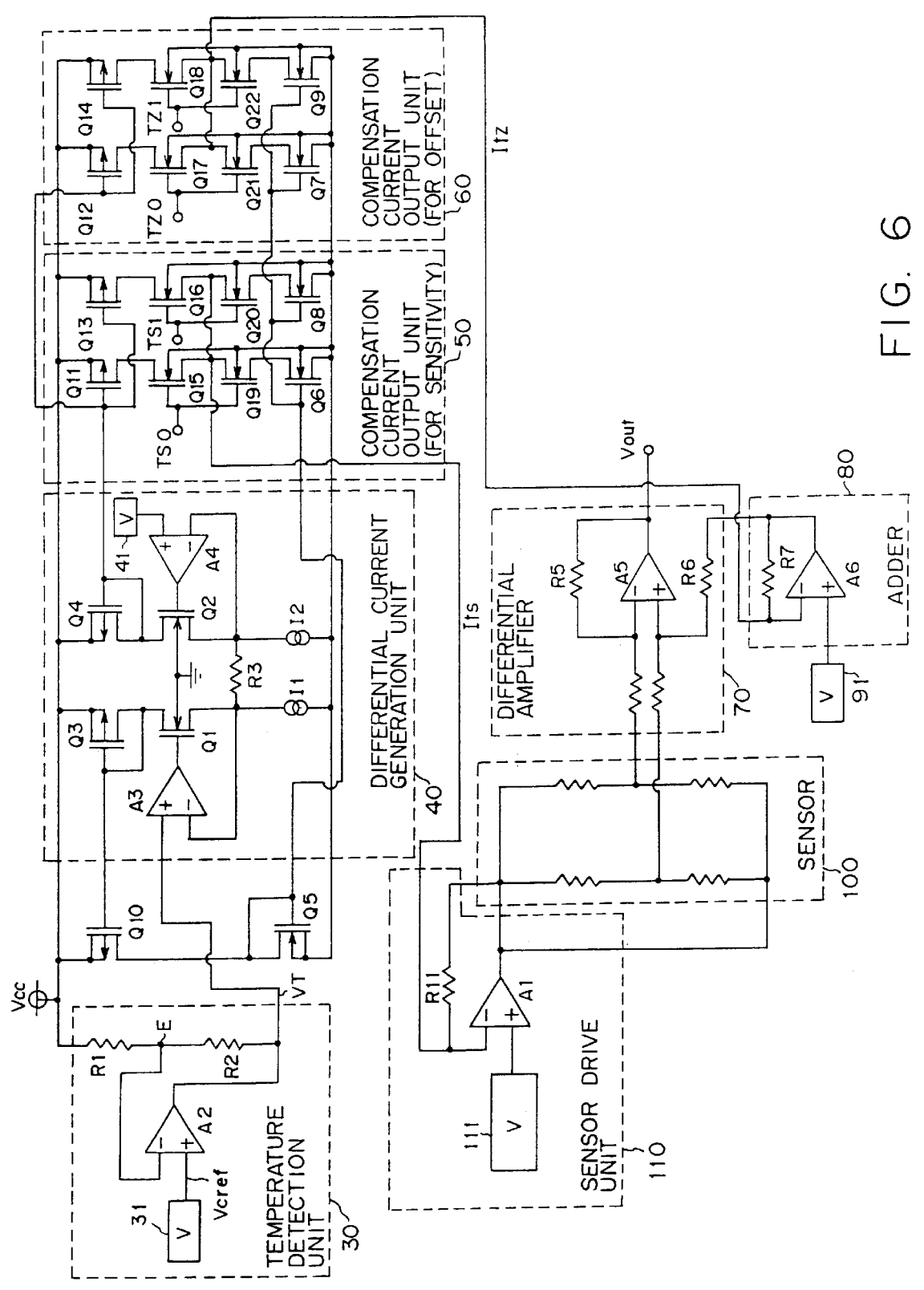

Described below is another embodiment of the present invention. FIG. 6 shows the configuration of a sensor output compensation circuit according to another embodiment of the present invention. The compensation circuit and the sensor 100 shown in FIG. 6 are formed on different semiconductor chips.

The compensation circuit shown in FIG. 6 has basically the same configuration as the compensation circuit shown in FIG. 2. However, these circuits are different in configuration of the sensor drive unit. That is, the sensor drive unit 20 of the compensation circuit shown in FIG. 2 drives the sensor 100 with a current while a sensor drive unit 110 of the compensation circuit shown in FIG. 6 drives the sensor 100 with a voltage. That is, the sensor drive unit 110 comprises a voltage generator 111 for outputting a voltage for adjustment of the sensitivity of the sensor 100; and an amplifier A11. The output from the voltage generator 111 is applied to the non-inversion terminal of the amplifier A11, and the sensitivity compensation current Its output from the compensation current output unit 50 is input to the inversion terminal of the amplifier A11. The output from the amplifier A11 is fed back to the inversion terminal through a resistor R11. Thus, the amplifier A11 and the resistor R11 form an adder, and the output from the amplifier A11 is applied to the sensor 100.

Described below is the operations of the sensor output compensation circuit shown in FIG. 6. Since the operations have a number of common points with the operations of the sensor output compensation circuit shown in FIG. 2, the descriptions of the common points are omitted here.

Assuming that the sensor 100 outputs the voltage proportional to both the amount ΔP of a change in pressure and the driving voltage. In this case, the output voltage Vout is represented by equation (21) with the output voltage from the sensor drive unit 110 defined as Vs.

$$V_{out} = KV_s\Delta P + V_{off} \tag{21}$$

In consideration of the sensitivity, Voff=0 is substituted for the equation (21) above. As described above, the output from the sensor depends on temperatures. The temperature factor of the output voltage Vout is defined as β. Assuming that the output voltage at the temperature T0 is defined as Vout, the output voltage at the temperature T1 is represented by (22).

$$Vout[1+\beta(T_1-T_0)] = K \times V_s \Delta P \tag{22}$$

Assume that the voltage generator 41 is preliminarily adjusted such that the output voltage from the voltage generator 41 matches the output voltage from the temperature detection unit 30 at the temperature T0, that the resistor R3 which passes a differential current in the differential current generation unit 40 and the resistor R11 provided in the sensor drive unit 110 have the same thermal characteristics, and that the temperature factor of the resistors R3 and R11 is α.

The output voltage from the temperature detection unit 30 is proportional to temperatures. Assuming that the amount of a change in output voltage from the temperature detection unit 30 when the temperature changes 1° C. is defined as ΔVT (V/° C.), the sensitivity compensation current Its generated by the compensation current output unit 50 is represented by equation (23). 'γ' indicates an adjustable proportional factor.

$$I_{ts} = \frac{\gamma \cdot \Delta V_T(T_1 - T_0)}{R3_0[1 + \alpha(T_1 - T_0)]} \tag{23}$$

A voltage applied to the sensor 100 generated by the sensitivity compensation current Its is represented by the following equation (24).

$$V_{ts} = R11_0[1 + \alpha(T_1 - T_0)] \times \frac{\gamma(T_1 - T_0)}{R3_0[1 + \alpha(T_1 - T_0)]} \tag{24}$$

$$= \frac{R11_0}{R3_0}\gamma(T_1 - T_0)$$

Thus, a voltage applied to the sensor 100 generated by the sensitivity compensation current Its is proportional to the amount of a change in temperatures. The voltage applied to the sensor 100 is obtained by adding the voltage independent of temperatures to the voltage depending on the temperatures as indicated by equation (25).

$$Vs = VS0 + Vts \tag{25}$$

The following equation (26) can be obtained from equations (22) and (25) above.

$$Vout[1 + \beta(T_1 - T_0)] = K \times (V_{s0} + V_{ts})\Delta P \tag{26}$$

$$= K \times \left(V_{s0} + \gamma \cdot \Delta V_T \frac{R11_0}{R3_0}(T_1 - T_0)\right)\Delta P$$

The following equation (27) is obtained when a temperature-dependent item is regarded in equation (26).

$$Vout \cdot \beta(T_1 - T_0) = K \times \gamma \cdot \Delta V_T \frac{R11_0}{R3_0}(T_1 - T_0)\Delta P \tag{27}$$

In equation (27), β indicates a temperature factor of the output voltage Vout, and γ indicates an adjustable proportional factor. That is, the temperature factor of the output voltage Vout can be removed by appropriately setting γ.

With the above described configuration, the resistor R3 which passes the differential current and the resistor R11 of the adder for converting the sensitivity compensation current into a voltage and adding the resultant voltage to the output voltage of the voltage generator 111 are designed to have the same thermal characteristics. Therefore, the temperature dependency of the sensitivity of the sensor 100 can be compensated for even if the sensitivity compensation current Its is large.

The configuration and the operation for compensating for an offset in the sensor output compensation circuit shown in FIG. 6 are the same as those of the circuit shown in FIG. 2. Therefore, the explanation of them is omitted here.

According to the above described embodiment of the present invention, the temperature dependency of a sensor can be compensated for even if the sensor and the circuit for compensating for the output from the sensor are provided on different chips.

A pressure sensor has been described in the above described embodiment of the present invention. However, the present invention can be widely applied to a circuit for compensating for the output from a sensor containing a resistor whose resistance value changes with a physical quantity of an object to be measured.

According to the present invention, a circuit for compensating for the output from a sensor containing a resistor whose resistance value changes with a physical quantity of an object to be measured stores information for adjustment of a temperature compensation circuit in memory, and realizes a configuration for performing a temperature compensation operation according to the stored information. As a result, a laser trimming process to be performed for the adjustment of the temperature compensation circuit is not required, thereby simplifying the adjustment.

What is claimed is:

1. A sensor output compensation circuit for compensating for an output from a sensor containing a resistor whose resistance value changes with a physical quantity of an object to be measured, the circuit comprising:
    drive means for driving the sensor;
    temperature detection means for outputting an electric current which changes with temperature;
    first temperature-compensating-current generation means comprising a plurality of current generation circuits for generating electric currents depending on the electric current output from said temperature detection means; and a plurality of switches having respective ON and OFF states for passing and interrupting the output from each of said current generation circuits, said first temperature-compensating-current generation means outputting a sum of the electric currents generated by and being output from said current generation circuits and passing through those of said switches which are in the ON state; and
    first storage means for storing information about the ON and OFF states of each switch of said plurality of switches provided in said first temperature-compensating-current generation means wherein:
        a drive state of said sensor is changeable according to the output from said first temperature-compensating-current generation means.

2. The circuit according to claim 1, further comprising:
    second temperature-compensating-current generation means comprising a second plurality of current generation circuits for generating electric currents depending on the electric current output from said temperature detection means; and a second plurality of switches each having respective ON and OFF states for passing and interrupting the output from each of said second plurality of current generation circuits, said second temperature-compensating-current generation means outputting a sum of the electric currents generated by and being output from said second plurality of current generation circuits and passing through those of said second plurality of switches which are in the ON state;
    second storage means for storing information about the ON and OFF states of each switch of said second plurality of switches provided in said second temperature-compensating-current generation means; and
    offset adjustment means for providing an offset to the output from the sensor wherein:
        said offset adjustment means outputs the offset responsive to the output from said second temperature-compensating-current generation means.

3. The circuit according to claim 2 wherein:
said temperature detection means comprises:
    a first voltage generator for outputting a voltage independent of temperature;
    a temperature detection circuit for outputting a voltage depending on temperature;
    first and second constant current generators for generating equal electric currents;
    a first current output circuit, connected to said first constant current generator, for outputting an electric current based on the output voltage from said first voltage generator;
    a second current output circuit, connected to said second constant current generator, for outputting an electric current based on the output voltage from said temperature detection circuit;
    a resistor for permitting passage of an electric current corresponding to the output potential difference between said first and second current output circuits; and
    an output circuit for outputting an electric current proportional to the electric current flowing through said resistor; and
said offset adjustment means comprises:
    a second voltage generator for outputting a predetermined voltage; and
    an adder, which has an amplifier and a feedback resistor, for converting the output current from said second temperature-compensating-current generation means into an output voltage, and for adding the output voltage to the voltage output from said second voltage generator wherein:
        a thermal characteristic of said resistor provided in said temperature detection means is substantially the same as a thermal characteristic of said feedback resistor of said adder.

4. The circuit according to claim 1 wherein:
said sensor is provided on a semiconductor chip which forms said sensor output compensation circuit; and
said temperature detection means comprises:
    a first voltage generator for outputting a voltage independent of temperature;
    a temperature detection circuit for outputting a voltage depending on temperature;
    first and second constant current generators for generating equal electric currents;

a first output current circuit, connected to said first constant current generator, for outputting an electric current based on the output voltage from said first voltage generator;

a second output current circuit, connected to said second constant current generator, for outputting an electric current based on the output voltage from said temperature detection circuit;

a resistor for permitting passage of an electric current corresponding to the output potential difference between said first and second current output circuits;

an output circuit for outputting an electric current proportional to the electric current flowing through said resistor; and a thermal characteristic of said resistor provided in said temperature detection means is substantially the same as a thermal characteristic of a resistor forming part of said sensor.

5. The circuit according to claim 1 wherein:

said sensor is provided on a semiconductor chip different from a semiconductor chip forming said sensor output compensation circuit; and said drive means comprises:
 a first voltage generator for outputting a predetermined voltage; and
 an adder for converting the output current from said first temperature-compensating-current generation means into an output voltage, and adding the output voltage to the voltage output from said first voltage generator wherein:
  said sensor is driven using the voltage output from said adder.

6. The circuit according to claim 5 wherein:

said temperature detection means comprises:
 a second voltage generator for outputting a voltage independent of temperature;
 a temperature detection circuit for outputting a voltage depending on temperature;
 first and second constant current generators for generating equal electric currents;
 a first current output circuit, connected to said first constant current generator, for outputting an electric current based on the output voltage from said second voltage generator;
 a second current output circuit, connected to said second constant current generator, for outputting an electric current based on the output voltage from said temperature detection circuit;
 a resistor for permitting passage of an electric current corresponding to the output potential difference between said first and second current output circuits; and
 an output circuit for outputting an electric current proportional to the electric current flowing through said resistor;

said adder comprises an amplifier and a feedback resistor of the amplifier; and a thermal characteristic of said resistor provided in said temperature detection means is substantially the same as a thermal characteristic of said feedback resistor of said adder.

7. A sensor output compensation circuit for compensating for an output from a sensor containing a resistor whose resistance value changes with a physical quantity of an object to be measured, the circuit comprising:

a drive circuit driving the sensor;

a temperature detection circuit outputting an electric current which changes with temperature;

a temperature-compensating-current generation circuit, comprising a plurality of current generation circuits for generating electric currents depending on the electric current output from said temperature detection circuit; and a plurality of switches having respective ON and OFF states for passing and interrupting the output from each of said plurality of current generation circuits, said temperature-compensating-current generation circuit outputting a sum of the electric currents generated by and being output from said plurality of current generation circuits and passing through those of said switches which are in the ON state; and a memory storing information about the ON and OFF states of each switch of said plurality of switches provided in said temperature-compensating-current generation circuit wherein:
 a drive state of said sensor is changeable according to the output from said temperature-compensating-current generation circuit.

8. A sensor output compensation circuit for compensating for temperature dependency of an output from a sensor, the sensor including a resistor whose resistance value changes with a physical quantity of an object to be measured, the circuit comprising:

a drive unit connected to and driving the sensor;

a temperature detection unit for detecting temperatures, said temperature detection unit having a temperature dependent resistor to output a voltage signal corresponding to the detected temperature;

a differential current generation unit coupled to said temperature detection unit, said differential current generation unit having a standard voltage generator and generating a differential current caused by the difference between the standard voltage and the voltage signal from said temperature detection unit;

a compensation current output unit coupled to said differential current generation unit, said compensation current output unit having a set of a plurality of current generation circuits and their respective switches operable between ON and OFF states and connected in series to said current generation circuits, said compensation current output unit outputting an electric current generated from said current generation circuits whose respective switches are in the ON state, the current from said compensation current output unit being output to said drive unit and compensating for the output from the sensor; and a storage unit connected to said compensation current output unit, said storage unit being provided with information on the ON and OFF states of each of said switches to determine the current value which is output from said compensation current output unit.

9. The circuit according to claim 8, wherein said differential current generation unit further includes a pair of constant current generators for generating electric currents equal to each other and a resistor provided between said constant current generators, a difference between said standard voltage and said voltage signal from said temperature detection unit causing occurrence of said differential current in said resistor.

10. The circuit according to claim 9, wherein said compensation current output unit further includes another set of a plurality of current generation circuits and their respective switches, said one set of said plurality of current generation circuits and switches outputting an electric current for adjusting the sensor output such that the sensor output has a constant ratio of changes in the output from the sensor to changes in the physical quantity measured, the other set of said plurality of current generation circuits and switches outputting an electric current for adjusting an offset of the sensor output, whereby said compensation current output unit compensates for said temperature dependency of the sensor output.

11. The circuit according to claim 10 further comprising an adder connected to and receiving the electric current from said compensation current output unit, said adder outputting an offset voltage determined by the received current from said compensation current output unit and adding said offset voltage to the sensor output voltage thereby compensating for the offset temperature dependency of the sensor output.

* * * * *